United States Patent [19]

Winstead

[11] Patent Number: 4,487,329
[45] Date of Patent: Dec. 11, 1984

[54] TAMPER-EVIDENT CLOSURE

[75] Inventor: Thomas W. Winstead, Baltimore, Md.

[73] Assignee: Maryland Cup Corporation, Owings Mills, Md.

[21] Appl. No.: 541,469

[22] Filed: Oct. 13, 1983

[51] Int. Cl.³ .............................................. B65D 17/40
[52] U.S. Cl. .................................... 220/276; 220/270
[58] Field of Search ................... 220/270, 276; 229/43

[56] References Cited

U.S. PATENT DOCUMENTS

| 2,751,102 | 6/1956 | Kihm |
| 3,257,022 | 6/1966 | Robinson |
| 3,388,827 | 6/1968 | Thanhauser et al. |
| 3,420,397 | 1/1969 | Miller |
| 3,425,592 | 2/1969 | Vogel |
| 3,465,910 | 9/1969 | Richie |
| 3,514,299 | 5/1970 | Thanhauser |
| 3,673,761 | 7/1972 | Leitz |
| 3,773,207 | 11/1973 | Dokoupil et al. |
| 3,812,991 | 5/1974 | Wurl |
| 4,103,803 | 8/1978 | Irvine |
| 4,113,136 | 9/1978 | Abbott | 220/276 |
| 4,212,409 | 7/1980 | Jeppson | 220/276 |
| 4,215,797 | 8/1980 | Chen | 220/276 |

Primary Examiner—George T. Hall
Attorney, Agent, or Firm—McDougall, Hersh & Scott

[57] ABSTRACT

A tamper-evident closure for a container comprises a center portion for overlying an open portion of a container, a seal portion, and a circumferential line of weakness surrounding the seal portion and defining a circumferential tear-strip. At least the tear-strip comprises deformable material. The tear-strip comprises a portion which creates a separation therein upon deformation when the closure is secured to a container. A method for applying the closure to containers is also disclosed.

24 Claims, 15 Drawing Figures

TAMPER-EVIDENT CLOSURE

FIELD OF THE INVENTION

This invention relates to closures for containers, and particularly to tamper-evident closures and methods for applying such closures to containers.

BACKGROUND OF THE INVENTION

A tamper-evident closure is one which, once applied to a container, cannot be removed without being irreversibly altered in some fashion. The alteration to the closure is an indication that the container has previously been opened. Therefore, one can readily determine whether someone has had access previously to the interior of the container.

Tamper-evident closures are particularly useful for packaging consumer goods such as, for example, foods and pharmaceuticals. A prudent consumer is concerned that the food, medicine, or other comestible purchased is pure and free from dangerous substances. Purchasing products in containers having tamper-evident closures offers assurance that, if no evidence of prior opening of the container is apparent, the contents of the container have not been tampered with or adulterated.

While consumers may desire to purchase goods in tamper-evident packages, provision of tamper-evident closures results in increased packaging costs. Producers, as well as consumers, therefore are desirous of a tamper-evident closure which is effective yet economical.

Accordingly, it is an object of this invention to provide a tamper-evident closure which serves the foregoing purposes.

An object of the invention is to provide tamper-evident closures which may be economically produced. A further object is to provide such closures which may be easily applied to containers.

A further object of the invention is to provide closures which securely seal a container and provide evidence of unauthorized entry, yet may be easily opened by a consumer. An additional object is to provide such closures which may be easily re-sealed by the consumer.

Still another object of the invention is to provide a method for assembling tamper-evident closures with containers in a highly efficient manner.

A further object of the invention is to provide a tamper-evident closure which includes a removable portion and means for facilitating removal of that portion from the closure once the closure is applied to a container. An object is to provide an efficient method for assembling such a closure with a container.

Yet another object of the present invention is to provide a tamper-evident closure having an integrally formed tab portion for facilitating removal of the closure from a container.

SUMMARY OF THE INVENTION

In accordance with the foregoing objects, a closure in accordance with the present invention comprises a center portion for overlying an open portion of a container, a seal portion for cooperating with the container, and a circumferential line of weakness surrounding the seal portion and defining a circumferential tear-strip, the tear-strip being separable from the center and seal portions at the line of weakness. At least the tear-strip is deformable, the tear-strip comprising a weakened portion which ruptures or a cut portion which separates upon deformation of the tear-strip. When the closure is applied to a container, the tear-strip is deformed into contact with a portion of the container for locking the closure thereto, the weakened or cut portion rupturing or separating upon such deformation.

In a preferred embodiment, the closure is formed of a shrinkable material, such as oriented thermoplastic. The weakened or cut portion may be formed so that, upon deformation, it defines a simple notch in the tear-strip. Alternatively, additional means may be provided so that, upon deformation, tab portions extend from the tear-strip.

In one preferred embodiment of the invention, a portion of the line of weakness defines a tab. Upon removal of the tear-strip, the tab may be used for grasping the closure and removing it from the container. A preferred seal for such a closure comprises cooperating frustoconical surfaces on the closure and container, the diameter of the frustoconical surfaces increasing in a direction toward the interior of the container.

A method for applying a closure to a container in accordance with the invention comprises positioning the closure over an opening of the container, engaging a portion of the closure with the container for securing the closure to the container, and creating a separation within the portion of the closure which engages the container. The engaging step comprises deforming such portion of the closure. The engaging step and the step of creating the separation may be performed substantially simultaneously. In a preferred embodiment of the inventive method, a first portion of the closure is adapted to cover an opening of a container, a second portion is adapted to engage the container for securing the closure thereon, and a line of weakness separates the first and second portions.

BRIEF DESCRIPTION OF THE DRAWINGS

The aforesaid objects and features will be best understood in light of the detailed description hereinbelow, taken together with the accompanying drawings in which.

DETAILED DESCRIPTION OF THE PREFERRED EMBODIMENTS

Figure 1:
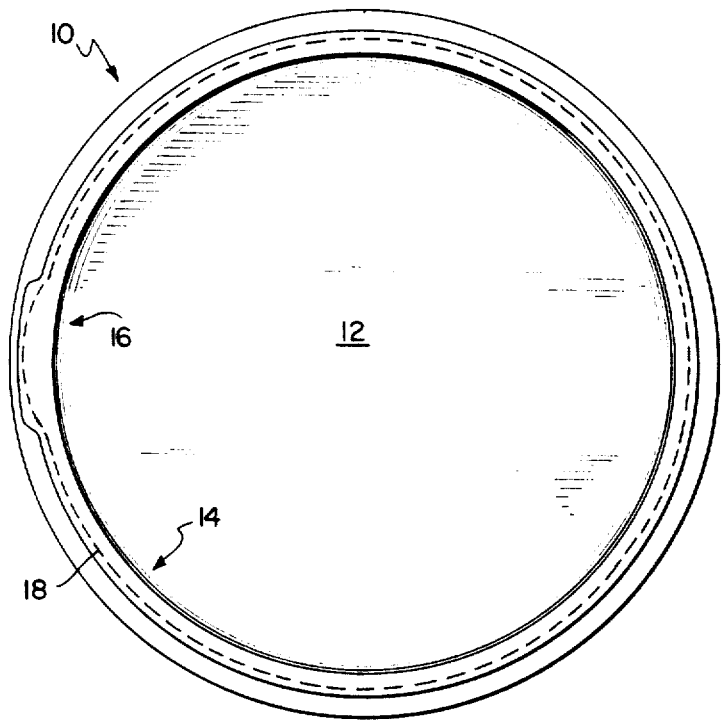
FIG. 1 is a top view of a first embodiment of a closure in accordance with the present invention.

Referring to FIG. 1, there is illustrated a first embodiment of a closure or lid in accordance with the invention, designated generally by reference numeral 10. Closure 10 includes a center portion 12 for overlying an opening of a container and a rim portion 14. Rim 14 preferably includes an outwardly extending shoulder 16 which will be discussed in greater detail hereinbelow. A line of weakness 18 extends around rim 14 defining a removable portion of the lid, as will also be discussed in greater detail below.

Figure 2:
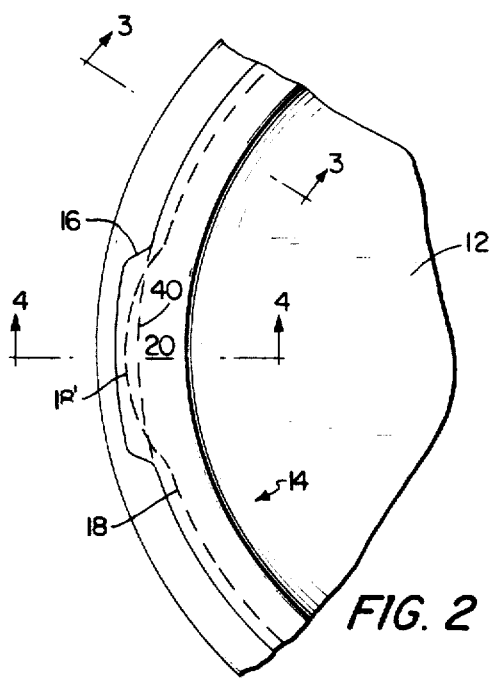
FIG. 2 is an enlarged detailed top view of a portion of the closure of FIG. 1.

FIG. 2 is an enlarged detailed view of closure or lid 10 in the vicinity of shoulder 16. As can be seen in FIGS. 1 and 2, the radius of the circle defined by line of weakness 18 is substantially constant about most of the circumference of closure 10, but varies in the vicinity of shoulder 16, defining a deviated portion 18′ of the line of weakness. The portion of rim 14 in the vicinity of shoulder 16 defined by line portion 18′ forms a tab 20 to be described in greater detail hereinafter.

Line of weakness 18, including portion 18′, may comprise, for example, a score line. Such a score line may be formed on the inside surface of the closure. This may be accomplished by passing the closure between a scoring roll and an anvil roll, in a manner fully described in co-pending application Ser. No. 494,022, filed May 12, 1983. Alternatively, line of weakness 18 may be formed by any other method which produces a circumferential line of weakness as illustrated and described.

Figure 3:
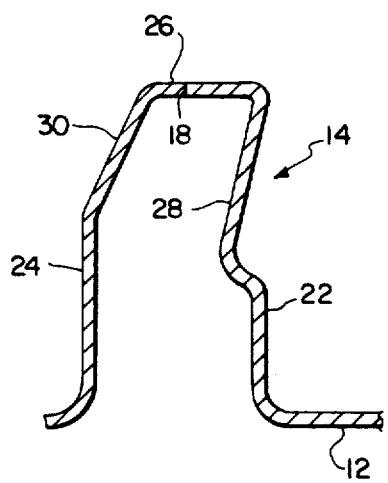
FIG. 3 is a sectional view along line 3—3 of FIG. 2.

FIG. 3 is a sectional view along line 3—3 of FIG. 2 illustrating the structure of rim portion 14. Rim 14 includes an inner wall 22, an outer wall comprising upper and lower portions 30 and 24, respectively, and a connecting wall 26. Inner wall 22 comprises a sealing portion 28 which is adapted to cooperate with a portion of a container for forming a seal therewith. While many different seal configurations may be employed in connection with the other features of the invention, sealing portion 28 advantageously comprises an outwardly tapered annular wall segment as illustrated defining a frusto-conical sealing surface. Specific details of the seal will be discussed in greater detail hereinbelow. Upper portion 30 of the outer wall is tapered in the embodiment illustrated.

Figure 4:
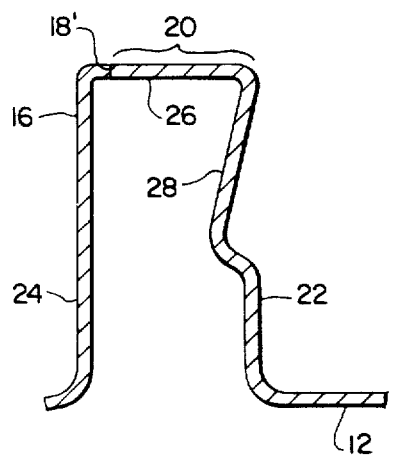
FIG. 4 is a sectional view along line 4—4 of FIG. 2.

FIG. 4 is a sectional view of rim portion 14, similar to that of FIG. 3, taken along line 4—4 of FIG. 2 at shoulder portion 16 of the closure. As can be seen in FIG. 4, inner wall 22 and seal portion 28 are of the same configuration as that shown in FIG. 3. However, upper portion 30 of the outer wall, rather than tapering inwardly as shown in FIG. 3, extends upwardly to form shoulder 16. Connecting wall 26 extends radially outwardly to meet the vertical portion of shoulder 16. Portion 18′ of the line of weakness, as shown in FIG. 4, is offset radially as compared to the remainder of line of weakness 18 illustrated in FIG. 3, thus forming tab portion 20 in connecting wall portion 26.

Figure 5:
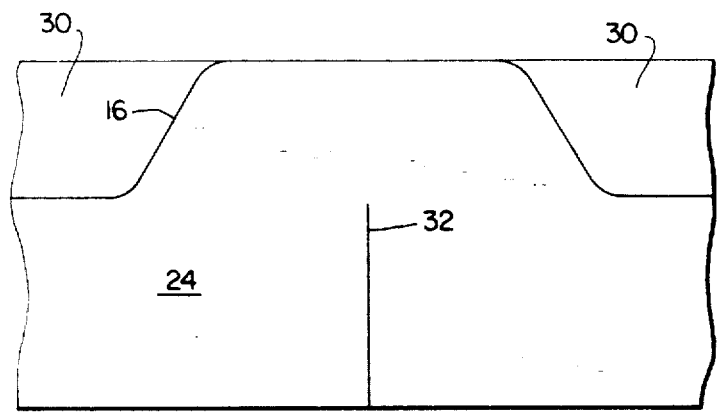
FIG. 5 is a side view of the closure of FIG. 1 in the vicinity of the portion illustrated in FIG. 4.

FIG. 5 is a side view of closure 10 in the region of line 4—4 of FIG. 2, illustrating shoulder 16. A portion 32 extends at least through wall portion 24, and may extend substantially up to or adjacent portion 18′ of the circumferential line of weakness. Portion 32 may comprise a cut completely through lower outer wall 24. Alternatively, portion 32 may comprise a weakened region within wall 24. Portion 32 may be weakened without completely cutting wall 24 by forming portion 32 as a score line, or it may be formed by other methods for weakening the material from which the closure is formed.

In a preferred embodiment, a closure in accordance with the invention is formed of shrinkable material, such as oriented thermoplastic. Closures of this material may be formed in accordance with the method disclosed in U.S. Pat. No. 4,250,129 issued Feb. 10, 1981, the disclosure of which is specifically incorporated herein by reference. Thermoplastic materials oriented in the manner disclosed in the patent will shrink upon heating. Thus, if lower outer wall portion 24 is heated after the closure is applied to a container, portion 24 will shrink, imposing stress on portion 32. As a result, the portions of wall 24 on either side of portion 32 will separate, as will be discussed in further detail below.

Figure 6:
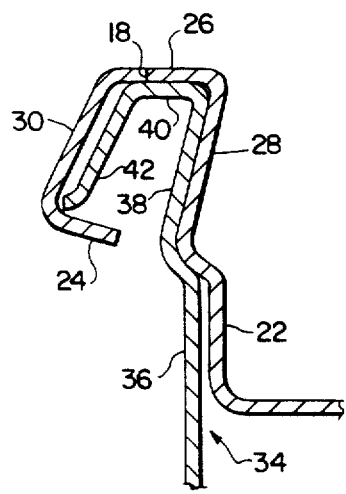
FIG. 6 is a sectional view as in FIG. 3 illustrating the closure applied to a container.

FIG. 6 is a sectional view of closure 10 in accordance with the invention at a portion thereof like that illustrated in FIG. 3, showing the closure after it has been applied to a container designated generally by reference numeral 34. Container 34 typically comprises a sidewall 36. A container sealing portion 38 is cooperable with sealing portion 28 of the closure. Like sealing portion 28, container sealing portion 38 preferably comprises a tapered wall segment defining a frustoconical sealing surface.

Container 34 further includes a radially extending wall 40 which is juxtaposed with connecting wall portion 26 of closure 10 when the closure is applied to the container. An outer flange portion 42 extends from radially extending wall 40.

To assemble closure 10 with container 34, the closure is first placed on the container. At this point, lower outer wall portion 24 will extend downwardly in the manner illustrated in FIG. 3. Lower outer wall portion 24 is then heated in a manner fully described in the aforesaid co-pending application Ser. No. 494,022.

Portion 24, being formed of oriented thermoplastic, will shrink and curl under outer flange 42. Closure 10 will thus be secured to container 34 and cannot be removed therefrom without first removing that portion of closure 10 which includes lower wall portion 24. As is shown in FIG. 6, line of weakness 18 overlies radial wall 40 of the container.

Figure 7:
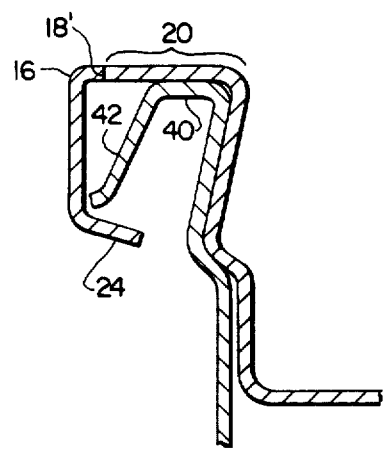
FIG. 7 is a sectional view as in FIG. 4 illustrating the closure applied to a container.

FIG. 7 is a sectional view of closure 10, similar to that of FIG. 4, after the closure has been secured to container 34. As shown in FIG. 7, lower outer wall portion 24 is curled under flange 42 as discussed above with respect to FIG. 6. Portion 18′ of the line of weakness is radially offset from radial wall portion 40 of the container. Therefore, tab portion 20 of connecting wall 26 of the closure extends outwardly beyond radial wall 40.

Figure 8:
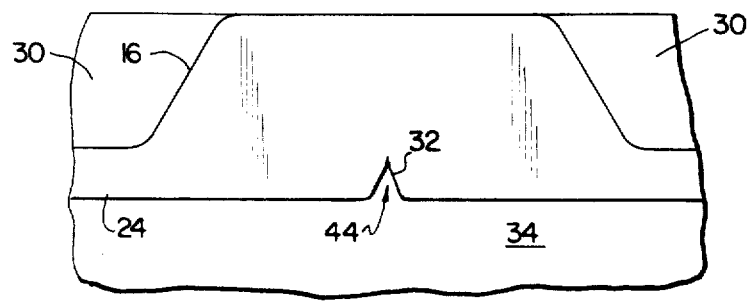
FIG. 8 is a side view of the closure of FIG. 1, similar to FIG. 5, showing the closure applied to a container.

FIG. 8 is a side view of closure 10 in the vicinity of shoulder 16 after the closure has been secured to container 34. As a result of deformation of wall portion 24, the closure comprises a notch or split 44 which results from separation of parts of wall 24 lying on either side of portion 32. If portion 32 is cut through wall 24, shrinking of wall 24 simply causes the portions thereof adjacent portion 32 to separate. However, if portion 32 is merely a weakened region not cut through wall 24, rupturing of portion 32 first occurs due to stress imposed by shrinking of wall portion 24, followed by separation as discussed above. Notch 44 defines a starting point for a tear-strip defined by line of weakness 18. Using a finger or other implement, the remainder of the tear-strip may be easily split to commence removal thereof. Outer wall portions 24 and 30 are removed, as well as the portions of connecting wall 26 which are radially beyond line 18. Once any part of line of weakness 18 is fully broken and/or these portions of the closure have been removed, line 18 cannot be repaired nor can the removed portions be replaced, providing irreversible evidence of the fact that the container has been opened or tampered with.

Once the tear-strip defined by line of weakness 18 has been removed, the outermost edge of the remaining closure defined by line 18 overlies radial wall portion 40 of the container. Tab 20 defined by portion 18' of the line of weakness extends beyond wall 40, as can be seen in FIGS. 2 and 7. Tab 20 may be grasped by a user for facilitating removal of the closure for gaining access to the interior of the container. Once removed, the closure may be reapplied, resealing the container and thus preserving its contents.

Frustoconical sealing surfaces 28 and 38 are advantageously employed in connection with the other features of the present invention. These surfaces are dimensioned such that they are pressed against each other when closure 10 is applied to container 34. The frustoconical configuration of these surfaces wedges closure 10 into the container opening, forming a tight seal. Simultaneously, due to the taper angle of surfaces 28 and 38, pressure between the surfaces pulls the closure downwardly, as shown in FIGS. 6 and 7, pressing connecting wall portion 26 tightly against radial wall portion 40, forming an additional sealing interface.

It is especially advantageous to employ tab 20 in conjunction with this preferred sealing arrangement. Since connecting wall portion 26 of closure 10 is pressed tightly against radial wall portion 40 of closure 34, upon removal of the tear-strip portion of closure 10, it may be difficult to grasp the remaining edge of the closure defined by line 18 overlying radial wall 40. However, since tab 20 defined by line portion 18' extends beyond radial wall 40, tab 20 may be easily grasped by a user, facilitating removal of the closure from the container.

While it is generally known that a tab may be provided on a closure for facilitating removal, the tab structure of the present invention is unique and advantageous. Tab 20 of the present invention comprises a part of an otherwise continuous surface of the closure. It does not protrude from the sealed container. It therefore will not interfere with packaging or storing of the container. Nor is it likely to be inadvertently impacted or caught by an extraneous object, resulting in damage to the closure. Since tab 20 is defined by a portion of the line of weakness, it is formed by the same manufacturing step which imparts such line of weakness to the closure, requiring no additional forming steps. The nature and position of tab 20 does not complicate the procedure for removing the tear-strip of the closure of the invention. Once the tear-strip is removed, no additional steps or procedures are required for positioning the tab so that it may be grasped. This feature of the present invention is thus uniquely advantageous.

Figure 9:
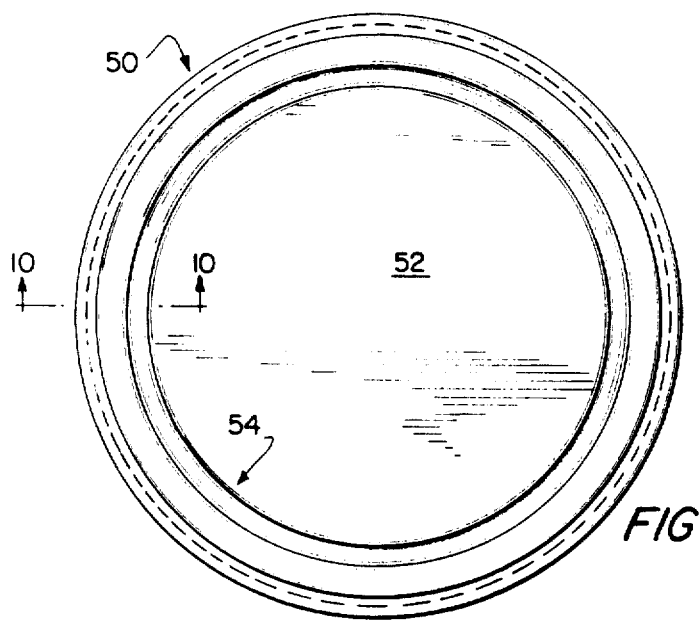
FIG. 9 is a top view of a second embodiment of a closure in accordance with the present invention.

FIG. 9 illustrates a top view of a second embodiment of a closure in accordance with the invention, designated generally by reference numeral 50. Closure 50 includes a center portion 52 and a rim portion 54.

Figure 10:
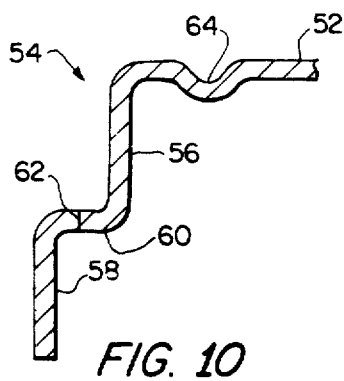
FIG. 10 is a sectional view along line 10—10 of the closure of FIG. 9.

FIG. 10 is a sectional view of rim portion 54 along line 10—10 of FIG. 9. Rim 54 comprises a skirt having a first portion 56 for forming a seal with a container and a second portion 58 which, in this preferred embodiment, is offset radially from first portion 56. A connecting portion 60 extends between skirt portions 56 and 58. A circumferential line of weakness 62 extends around the closure in connecting portion 60. Line of weakness 62 may be, for example, a score line, or may be formed by other methods. A score line may be formed in the undersurface of portion 60 by the method disclosed in co-pending application Ser. No. 494,022, as discussed above. A circumferential indentation 64 may be provided for imparting some rigidity to the closure. Indentation 64 may be positioned to cooperate with a portion of the container to enhance the seal between the closure and the container, as will be further discussed below.

Figure 11:
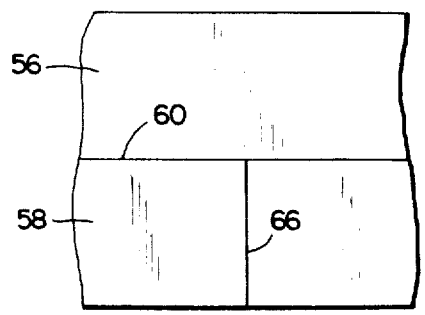
FIG. 11 is a side view of the closure of FIG. 9.

FIG. 11 is a side view of a portion of closure 50 illustrating a portion 66. Like portion 32 of FIG. 5, portion 66 may comprise a cut completely through skirt portion 58 or a weakened region comprising a score line or the like. Portion 66 extends substantially up to or adjacent line of weakness 62.

Figure 12:
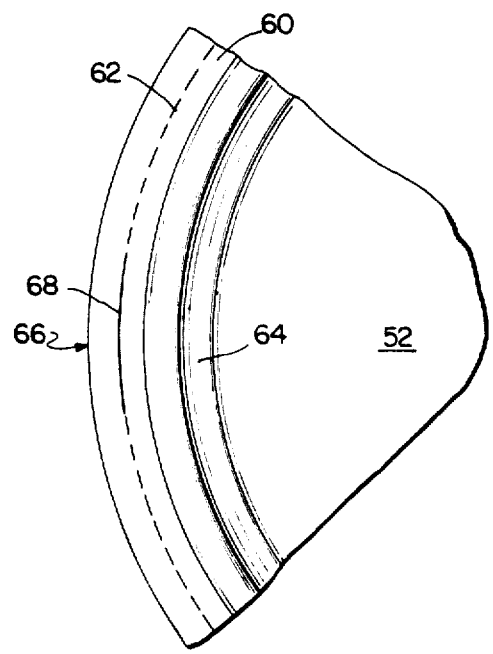
FIG. 12 is a detailed top view of a portion of an alternate embodiment of the closure of FIG. 9.

FIG. 12 is a detailed top view of a modification 50A of the closure 50 illustrated in FIG. 9. Particularly, the embodiment of FIG. 12 comprises a severed portion 68 cut through connecting portion 60 of rim 54. Severed portion 68 extends along and is coincident with a portion of line of weakness 62, and extends a distance to either side of the location of cut or weakened portion 66, shown more clearly in FIG. 11. The purpose of severed portion 68 will be discussed in greater detail below with reference to FIG. 15.

Figure 13:
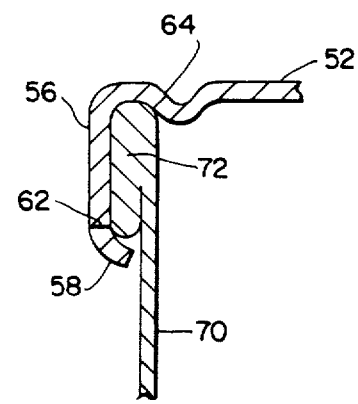
FIG. 13 is a sectional view of the closure of FIG. 9 applied to a container.

FIG. 13 is a sectional view of rim 54 of either closure 50 or 50A after the closure has been secured to a container. The container includes a sidewall 70 and a container bead 72 which may be, for example, a rolled portion of wall 70. Closure 50 or 50A is positioned over the container opening. Skirt portion 56 cooperates with container portion 72 forming a seal. The interior surface of indentation 64 may be sized and positioned to contact the innermost portion of bead 72, thus enhancing the seal.

Like closure 10 illustrated in FIG. 1, closure 50 or 50A is preferably formed from shrinkable material such as oriented thermoplastic. After positioning closure 50 or 50A on the container, heat is applied to skirt portions 58 and 60, causing these portions to shrink and curl under bead 72 of the container. The closure is thus locked onto the container as previously described. After shrinking, line of weakness 62 is adjacent the lower part of bead 72, as shown in FIG. 13. The distinction between portions 58 and 60 of the closure typically becomes obscured as a result of the thermal shrinking process, and is thus not evident in the closure once secured to the container, as seen in FIG. 13.

Figure 14:
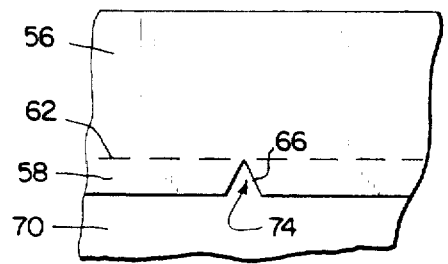
FIG. 14 is a side view of the embodiment of FIG. 11 applied to a container.

FIG. 14 is a side view of the embodiment of the closure 50 illustrated in FIG. 11 after the closure has been secured to a container. Upon shrinking and deformation of portions 58 and 60, parts of skirt portion 58 on either side of portion 66 separate forming a separation, notch or split 74. If portion 66 is cut completely through skirt portion 58, the parts of skirt portion 58 on either side of portion 66 simply separate forming the notch 74. If portion 66 comprises a weakened region not cut through skirt portion 58, the weakened region first ruptures due to stress imparted by shrinking, followed by separation as noted. Notch 74 serves as a starting point for a tear-strip which generally comprises skirt portion 58, as shown in FIG. 14, defined by line of weakness 62. Tearing of this strip is easily started with a finger or other implement.

Figure 15:
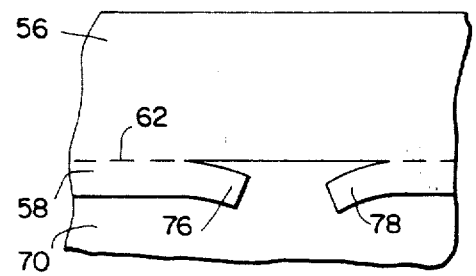
FIG. 15 is a side view of the embodiment of FIG. 12 applied to a container.

FIG. 15 is a side view of the closure 50A of FIG. 12 including severed portion 68, after the closure 50A has been secured to a container. Upon shrinking and deformation of portions 58 and 60, the parts of skirt 58 on either side of portion 66 separate, as described above. The parts of lower skirt portion 58 on either side of weakened portion 66 which are coextensive with severed portion 68 thereby form a pair of tabs 76 and 78, one tab being on either side of the separation at portion 66. The shrinking and curling action of skirt portion 58 will cause tabs 76 and 78 to protrude somewhat from the container. These tabs may therefore be easily grasped to commence removal of the tear-strip defined by line of weakness 62.

Like the embodiment of the invention described with respect to FIGS. 1-8, closures 50 and 50A will exhibit irreversible evidence of tampering once any portion of line of weakness 62 is broken, removing any portion of the tear-strip. Once the tear-strip is removed by a consumer, either closure may be replaced on the container, thus preserving its contents.

The present invention provides tamper-evident closures for containers which may be produced by relatively simple processes and which may be rapidly and efficiently applied to containers. The simplified procedure for applying the closures to containers itself produces a convenient starting point for removal of the tamper-evident means of the closure, thus eliminating forming steps typically required with similar closures known in the prior art. Specific embodiments of the invention include additional means for facilitating separation of the tamper-evident tear-strip of the closure or removal of the resealable portion of the closure from a container.

While the invention has been described with reference to the accompanying drawings, it is not limited to the details and specific features shown therein as obvious modifications may be made by those of ordinary skill in the art. The scope of the present invention is limited only by the claims appended hereto.

What is claimed:

1. A combination of a container and a closure, said container comprising a container rim surrounding an opening thereof and said closure comprising a closure rim cooperating with said container rim;
   said container rim comprising a first seal portion and an adjacent surface;
   said closure rim comprising a second seal portion for engaging said first seal portion and an adjoining surface which is substantially parallel to and engages said adjacent surface, and a tear-strip underlying at least a portion of said container for securing said closure thereto;
   wherein said adjoining surface is substantially coextensive with said adjacent surface along a first circumferential part of said closure and extends beyond said adjacent surface at a second circumferential part of said closure;
   said adjoining surface comprising a circumferential line of weakness for defining said tear-strip, wherein said line of weakness is juxtaposed to said adjacent surface along said first circumferential part of said closure and extends away from said adjacent surface along said second circumferential part of said closure for defining a tab portion upon removal of said tear strip.

2. A combination as in claim 1, wherein said first and second seal portions comprise frustoconical surfaces cooperable with each other for forming a seal between said closure and said container, said frustoconical surfaces having diameters which increase in a direction toward the interior of said container.

3. A closure adapted to be applied to a container, said closure comprising:
   means for defining a center portion for overlying an open portion of the container;
   means for defining a seal portion for cooperating with the container;
   means for defining a circumferential line of weakness surrounding said seal portion and for defining a circumferential tear-strip;
   wherein at least said tear-strip comprises deformable material;
   said tear-strip further comprising a cut portion, and first and second portions on opposite sides of said cut portion which separate upon deformation of said tear-strip.

4. A closure as in claim 3, in combination with a container, wherein
   said circumferential tear-strip is sized to surround a portion of said container; and
   said tear-strip is deformable into contact with said portion of said container for locking said closure to said container and separating said first and second portions of said tear-strip.

5. A closure as in claim 3, wherein at least said tear-strip comprises a shrinkable material, said separating occurring upon shrinking of said tear-strip.

6. A closure as in claim 3, wherein at least said tear-strip comprises oriented thermoplastic material.

7. A closure as in claim 5, wherein at least said tear-strip comprises oriented thermoplastic material.

8. A closure as in claim 3, wherein said cut portion extends generally along a line which is non-parallel to said circumferential line of weakness.

9. A closure as in claim 3, wherein said cut portion extends from a circumferential edge of said tear-strip to a position intermediate said circumferential edge and said line of weakness.

10. A closure as in claim 3, further comprising means for defining a severed portion extending along and coincident with a portion of said circumferential line of weakness, wherein said cut portion is adjacent said severed portion.

11. A closure as in claim 10, wherein said first and second portions of said tear-strip define tab portions extending from said tear-strip on each side of said cut portion subsequent to separation thereof.

12. A closure as in claim 3, wherein
   said center portion of said closure is surrounded by means for defining a rim portion which is adapted to cooperate with a container, said rim portion comprising an inner wall portion, an outer wall portion, and a connecting wall portion;
   said inner wall portion comprising said seal portion;
   said connecting wall portion comprising said circumferential line of weakness; and
   said outer wall portion comprising said tear-strip.

13. A closure as in claim 12, in combination with a container, wherein
   said seal portion of said closure comprises a frustoconical surface having a diameter which increases along a direction extending from a position generally adjacent said connecting wall portion to a position generally adjacent said center portion of said closure;

said container comprising a frustoconical sealing surface cooperable with said seal portion of said closure.

14. A closure as in claim 12, in combination with a container, wherein said connecting wall portion overlies an adjacent portion of said container and said circumferential line of weakness defines a tab extending away from said adjacent portion of said container.

15. A combination as in claim 14, wherein said seal portion of said closure comprises a frustoconical surface having a diameter which increases along a direction extending from a position generally adjacent said connecting wall portion to a position generally adjacent said center portion of said closure;

said container comprising a frustoconical surface cooperable with said seal portion of said closure.

16. A closure as in claim 12, wherein said circumferential line of weakness defines a first radius along a first portion thereof, and deviates from said first radius along a second portion thereof.

17. A closure as in claim 16, in combination with a container, wherein said line of weakness lies adjacent said container along said first portion, and extends away from said container along said second portion.

18. A closure as in claim 16, wherein said second portion of said line of weakness defines a tab.

19. A combination as in claim 17 wherein said second portion of said line of weakness defines a tab.

20. A Closure as in claim 12, further comprising means for defining a generally outwardly extending shoulder along a circumferential portion of said rim means.

21. A closure as in claim 20, wherein said cut portion of said tear-strip is adjacent said shoulder.

22. A closure as in claim 20, further comprising a deviation of said circumferential line of weakness defining a tab adjacent said shoulder.

23. A closure as in claim 21, further comprising a deviation of said circumferential line of weakness defining a tab adjacent said shoulder.

24. A closure as in claim 22, in combination with a container, wherein said seal portion of said closure comprises a frustoconical surface having a diameter which increases along a direction extending from a position generally adjacent said connecting wall portion to a position generally adjacent said center portion of said closure;

said container comprising a frustoconical surface cooperable with said seal portion of said closure.

* * * * *